(12) United States Patent
Rego de Oliveira et al.

(10) Patent No.: US 11,656,114 B2
(45) Date of Patent: May 23, 2023

(54) TANK LEVEL SENSOR AND MANAGEMENT SYSTEM

(71) Applicant: AMTROL Licensing Inc., West Warwick, RI (US)

(72) Inventors: Tiago Teixeira Rego de Oliveira, Oporto (PT); Antonio Paulo Reimao Dias Sardinha, Carvalhos (PT); Pedro Alexandre Queiros Oliveira Silva Vieira, Matosinhos (PT); Lanceres Mendez Senen, Braga (ES); Vitor Manuel Gomes Correia, Briteiros Santa Leocadia (PT)

(73) Assignee: AMTROL LICENSING INC., West Warwick, RI (US)

(*) Notice: Subject to any disclaimer, the term of this patent is extended or adjusted under 35 U.S.C. 154(b) by 238 days.

(21) Appl. No.: 17/076,915

(22) Filed: Oct. 22, 2020

(65) Prior Publication Data

US 2021/0116288 A1   Apr. 22, 2021

Related U.S. Application Data

(60) Provisional application No. 63/054,479, filed on Jul. 21, 2020, provisional application No. 62/924,526, filed on Oct. 22, 2019.

(51) Int. Cl.
*G01F 23/296* (2022.01)
*G01K 3/00* (2006.01)
*G06K 7/10* (2006.01)

(52) U.S. Cl.
CPC .......... *G01F 23/296* (2013.01); *G01K 3/005* (2013.01); *G06K 7/10366* (2013.01)

(58) Field of Classification Search
CPC .................................................... G01F 23/296
See application file for complete search history.

(56) References Cited

U.S. PATENT DOCUMENTS

| 2006/0243347 A1* | 11/2006 | Humphrey | ............... F17C 3/00 |
| | | | 141/95 |
| 2009/0289113 A1* | 11/2009 | Vilnai | .................... G06Q 30/06 |
| | | | 705/41 |

(Continued)

FOREIGN PATENT DOCUMENTS

| JP | 2010116981 | 5/2010 |
| WO | 2018002363 | 1/2018 |

OTHER PUBLICATIONS

International Search Report and Written Opinion of the International Searching Authority; PCT/US20/56742; dated Feb. 3, 2021; 18 pgs.

*Primary Examiner* — Joseph H Feild
*Assistant Examiner* — Pameshanand Mahase
(74) *Attorney, Agent, or Firm* — Tucker Ellis LLP

(57) ABSTRACT

A sensor assembly is positioned on an exterior of a tank to measure a fluid level within the tank. The tank is modified to include a surface feature and the sensor assembly is slotted within that surface feature. The sensor assembly includes a sensor device and a control circuit configured to drive the sensor device and evaluate readings to determine the fluid level. The sensor assembly further includes a communications interface to enable communication with a management system via a communications network. The management system can store information (e.g. fill status) related to the tank and additionally communicate with vendors or end users to coordinate resupply.

18 Claims, 11 Drawing Sheets

(56) References Cited

U.S. PATENT DOCUMENTS

| | | | | |
|---|---|---|---|---|
| 2010/0242593 | A1 | 3/2010 | Lagergren | |
| 2012/0317777 | A1* | 12/2012 | Cajiga | B67D 99/00 |
| | | | | 29/428 |
| 2016/0116324 | A1* | 4/2016 | Job | G01F 23/804 |
| | | | | 73/290 V |
| 2017/0008647 | A1* | 1/2017 | Pountney | G01M 17/007 |
| 2017/0052054 | A1* | 2/2017 | Merker | F17C 13/021 |
| 2017/0241376 | A1* | 8/2017 | Dudar | F02M 25/0809 |
| 2018/0313684 | A1 | 11/2018 | Crosier | |
| 2020/0072698 | A1* | 3/2020 | Baird, IV | G01K 13/00 |
| 2020/0355540 | A1* | 11/2020 | Moore | G01F 23/2968 |

* cited by examiner

TANK LEVEL SENSOR AND MANAGEMENT SYSTEM

CROSS-REFERENCE TO RELATED APPLICATIONS

This application is a non-provisional of and claims priority to U.S. Provisional Patent Application No. 62/924,526, filed on Oct. 22, 2019, and U.S. Provisional Patent Application No. 63/054,479, filed on Jul. 21, 2020. The entireties of the aforementioned applications are incorporated herein by reference.

TECHNICAL FIELD

This application relates generally to level measurement and, more particularly, to an Internet-enabled sensor system for a tank.

BACKGROUND

Ascertaining a fluid level within a tank, such as a liquid petroleum gas (LPG) tank, within a system is an important step to determine when to replace or refill the tank. Some level measurement techniques require an opening or penetration through the tank to detect a level. For instance, a mechanical sensor may utilize a suspended float that changes position at different levels, which then provides a reading to a gauge mounted on the outside of the tank. Other techniques may be contactless, but still require an opening. For example, an ultrasound device may be inserted into and suspended from a top wall of a tank to detect a level.

Other solutions may be exterior to the tank and detect a level without an opening. For instance, a temperature sensitive tape can be placed on the exterior surface of the tank to provide a visual indication of the level. In another example, a device, which is similar to a stud finder in some respects, is passed over the exterior of the tank by an operator to determine the level.

These solutions merely provide a level indication local to the tank. Physical inspection of the tank is required in order to ascertain the status.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a sensor assembly is positioned on an exterior of a tank to measure a fluid level within the tank. The sensor assembly includes a sensor device and a control circuit configured to drive the sensor device and evaluate readings to determine the fluid level. The sensor assembly further includes a communications interface to enable communication with a management system via a communications network. The management system can store information (e.g. fill status) related to the tank and additionally communicate with vendors or end users to coordinate resupply, level analysis, etc. . . . .

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

Figure 1:
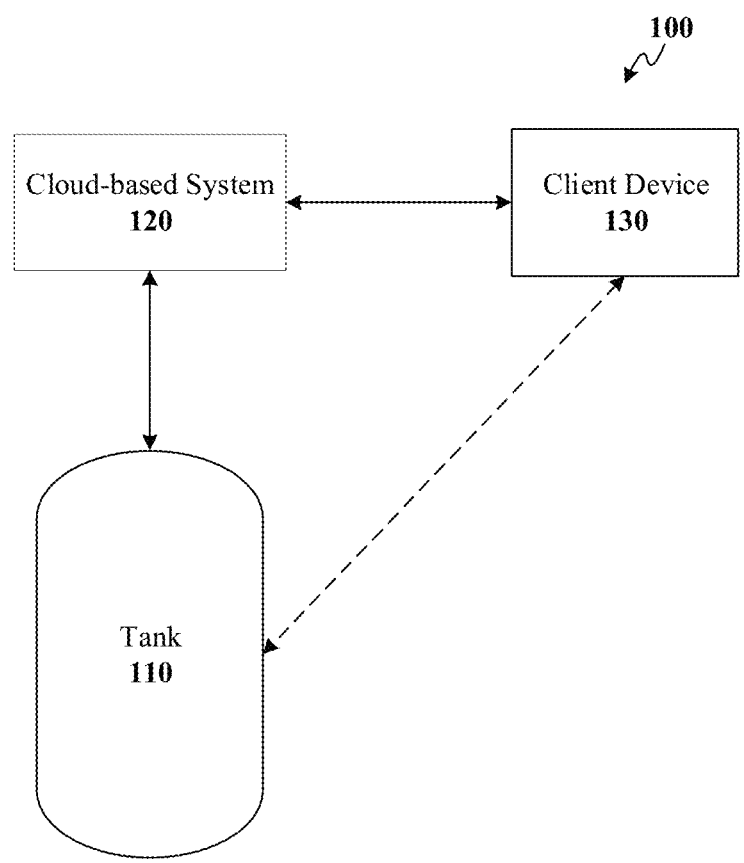
FIG. 1 is a schematic block diagram of an exemplary, non-limiting embodiment of a tank management system according to one or more aspects.

As discussed in the background, measurements of fluid level in a tank (e.g. an LPG tank) may utilize an opening into the tank and/or provide measurements for local consumption only. Such devices do not provide robust monitoring and management of the tank and physical inspection of the tank and system in which the tank is deployed is often necessary.

In various, non-limiting embodiments, a system and associated methods are provided for tank management. A sensor assembly is associated with a tank. The sensor assembly includes a level sensor to provide a sensor reading indicative of a fluid level within the tank. A control circuit of the sensor assembly interprets the sensor reading and may utilize a communications interface to communicate a level measurement to a remote system and/or a client device in proximity to the tank. Accordingly, the tank can be monitored and managed off-site.

The above noted features and embodiments will be described with reference to the drawings, wherein like reference numerals are used to refer to like elements throughout.

FIG. 1 shows a schematic block diagram of an exemplary, non-limiting embodiment of an Internet-enabled tank management system. System 100 can include a tank 110, which is communicatively coupled to a cloud-based system 120 and/or a client device 130. The client device 130 may also be communicatively coupled with the cloud-based system 120.

Figure 2:
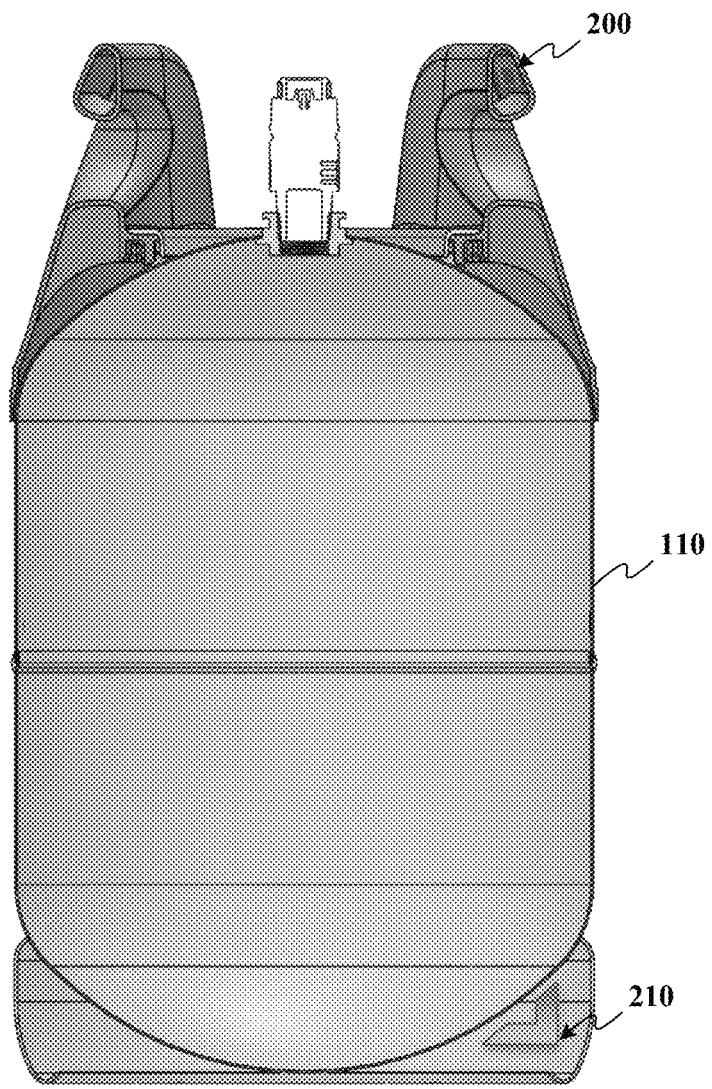
FIG. 2 illustrates an exemplary, non-limiting embodiment of a tank in accordance with various aspects.

As shown in FIG. 2, tank 110 may be a portable gas cylinder. In FIG. 2, a top of the tank 110 is facing up and a bottom of the tank 110 is facing down. Tank 110 is configured to store a suitable liquified pressurized gas, such as liquid petroleum gas. A cylinder stand or foot ring may be attached to the tank 110 as shown. The tank 110 may be made of a suitable material, such as metal, and the foot ring may be made of a suitable non-metal material, such as plastic. The tank includes an upper portion having a valve port, a lower portion, and a collar (see FIG. 3) secured to the lower portion. A suitable handle assembly may be attached to the tank 110 at the upper portion. The tank 110 can include one or more liners of a material. For instance, the tank 110 can include a liner made of a first material, which may be at least one of a metal (e.g. steel, stainless steel, aluminum, etc.), a plastic (e.g. thermoplastic) among others. In certain embodiments, the container can include a wrapping of a second shell, which may be a composite material made of a glass fiber, carbon fiber, or aramid fiber with a thermoplastic or thermoset resin.

The collar may be secured to the lower portion in any suitable manner, such as by welding, or may alternatively be integrally formed with the lower portion. The collar, which may be a circular collar, includes a base that is attached to the lower portion, and a flange extending around and radially outwardly from the base. The flange includes a plurality of notches circumferentially spaced around the flange inward from an edge of the flange. The collar may be made of a suitable material, such as metal, and may be made in a suitable manner, such as pressing. The notches prevent the metal collar from cracking as it is bent during pressing and additionally serve to receive rotational lock clips on the foot ring.

As shown in FIG. 2, the tank 110 may include indicia 200 that provides a tank identification. The indicia 200 may provide a machine-readable and/or a human-readable variant of the tank identification. In one embodiment, the indicia 200 may be a RFID tag or a NFC transceiver and positioned within the handle assembly. In another embodiment, the indicia 200 may be a barcode or a QR code. In an example, the tank identification provided by indicia 200 may be unique to tank 110 and utilized to retrieve or access information associated with tank 110, request resupply of tank 110, request service on tank 110, request replacement of tank 110, etc. For example, client device 130 can retrieve the tank identification from indicia 200 and access such functionality via the cloud-based system 120.

Figure 3:
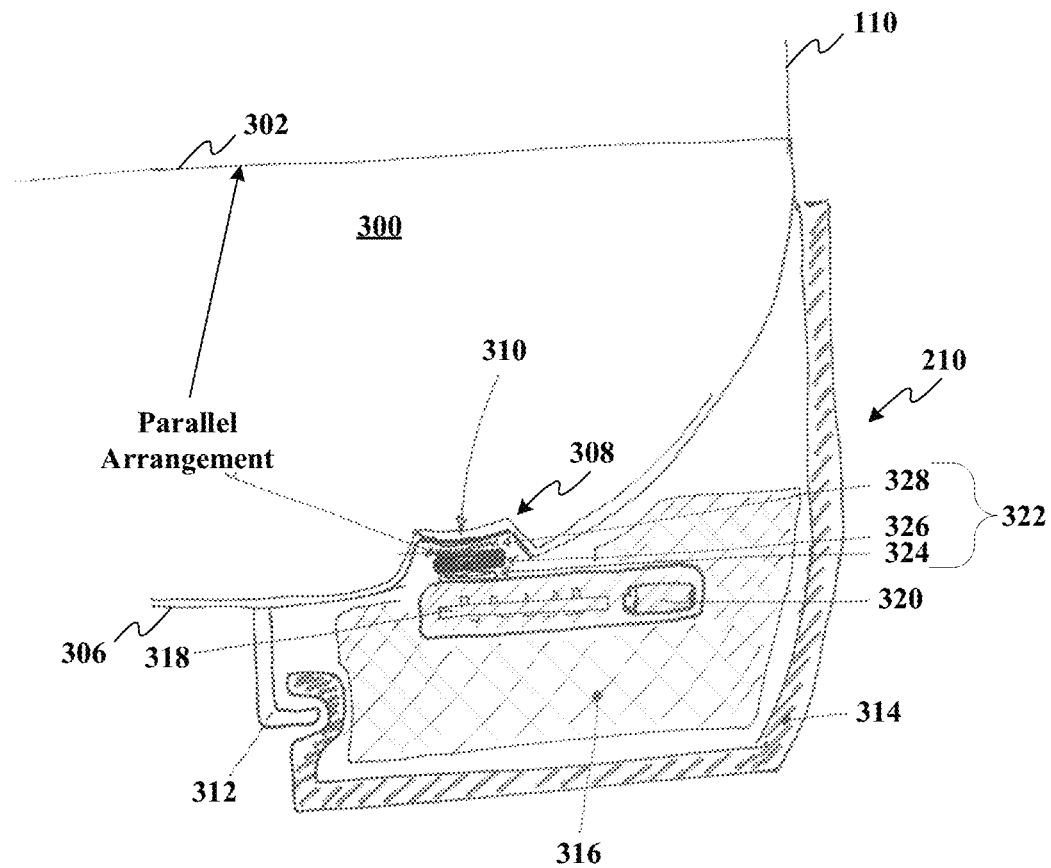
FIG. 3 illustrates an exemplary, non-limiting embodiment of a sensory assembly according to one or more aspects.

A sensor assembly 210 is provided on tank 110. For example, as shown in FIG. 2, the sensor assembly 210 may be housed within the foot ring. Turning to FIG. 3, a more detailed illustration of sensor assembly 210 in conjunction with tank 110 is depicted. The tank 110 contains a fluid 300 such as a liquid petroleum gas. The fluid 300 fills tanks 110 to a level 302. Sensor assembly 210 is housed within a footring 314 and positioned adjacent to tank 110. Specifically, sensor assembly 210 is at least partially situated within a surface feature 308 or recess formed on a bottom surface 306 of tank 110. Surface feature 308 may include a generally convex-shaped interface 310 for a sensor device 322. The sensor device 322 includes an ultrasound sensor 326 separated from the interface 310 with a gel layer 328. The ultrasound sensor 326 may be stabilized with a spring 324 or memory foam to maintain contact with interface 310.

The ultrasound sensor 326 is coupled to an electronics device 318 supplied with power from a battery 320. The sensor assembly 210, including the ultrasound sensor 326, electronics device 318, and battery 320 may be surrounded by a shock absorbing material 316 and housed within footring 314. Footring 314 is mounted and secure to the tank 110 via a collar 312 (described above).

As shown in FIG. 3, in one embodiment, the ultrasound sensor 326 is positioned to be parallel with respect to fluid level 302. In a further embodiment, the electronics device 318 and battery 320 may be encapsulated in a resin approved for use in explosive atmospheres.

Figure 4:
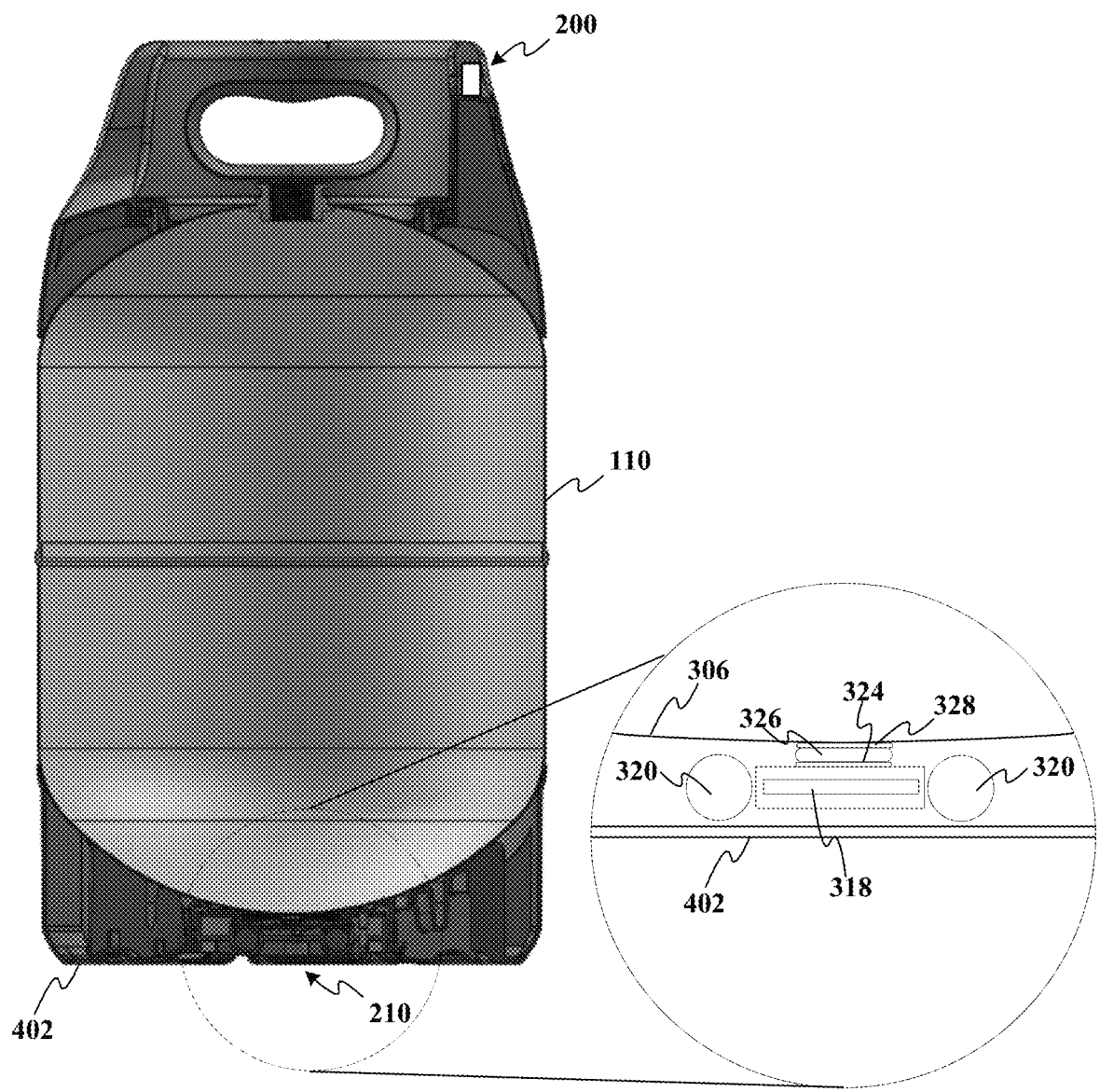
FIG. 4 illustrates an exemplary, non-limiting embodiment of a tank in accordance with various aspects.

According to another embodiment, FIG. 4 illustrates the sensor assembly 210 positioned at a center of tank 110 and within a stand base 402. In this embodiment, a bottom surface of tank 110 may be unaltered. For instance, when the sensor assembly 210 is positioned at the center, the surface feature 308 may be eliminated. In addition, a conventional bottom surface of the tank 110 may provide an interface similar to convex-shaped interface 310 described above. Still further, the gel layer 328 may be utilized in this embodiment as well as the spring 324 or memory foam described above.

Figure 5:
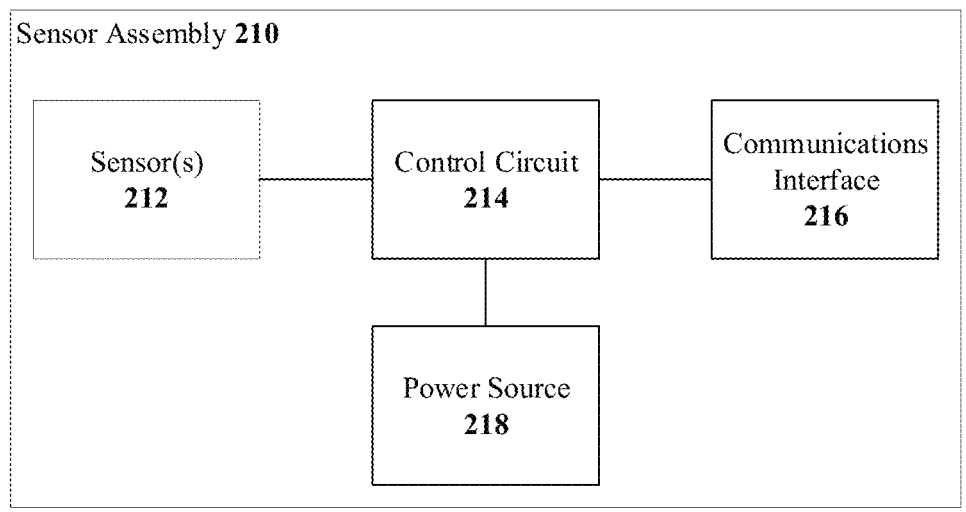
FIG. 5 is a schematic block diagram of an exemplary, non-limiting embodiment of a sensor assembly according to one or more aspects.

Turning to FIG. 5, a schematic diagram of sensor assembly 210 is illustrated. Sensor assembly 210 includes one or more sensors 212, such as ultrasound sensor 326 and/or a temperature sensor, coupled to a control circuit 214, which is powered by power source 218, such as battery 320. The sensor 212 provides a sensor reading (e.g. an ultrasound signal or a temperature signal) to control circuit 214.

In one example, the control circuit 214 may interpret the sensor reading from an ultrasound sensor into a fluid level. The fluid level may be stored by control circuit 214 and/or communicated, via communications interface 216, to cloud-based system 120 and/or client device 130.

In another example, the control circuit 214 may interpret a temperature signal from a temperature sensor. The control circuit 214 may store or communicate the temperature reading. In another aspect, the control circuit 214 may compare the temperature reading to a threshold and issue an alarm, for example, via communications interface 216, when the temperature reading exceeds the threshold.

Figure 6:
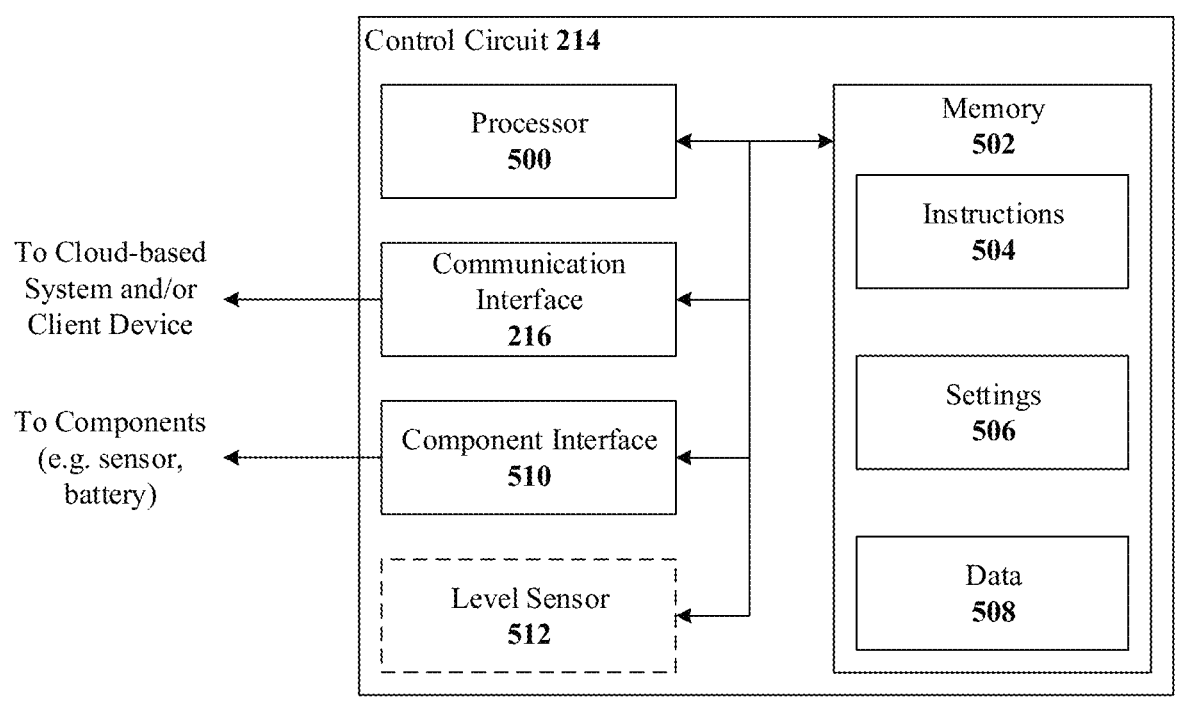
FIG. 6 is a schematic block diagram of an exemplary, non-limiting embodiment of a control circuit of a sensor assembly according to one or more aspects.

Turning to FIG. 6, illustrated is a schematic block diagram of an exemplary, non-limiting embodiment for control circuit 214. As shown in FIG. 6, control circuit 214 includes one or more processor(s) 500 configured to executed computer-executable instructions 504 such as instructions composing a control and communication process for sensor assembly 210. Such computer-executable instructions can be stored on one or more computer-readable media including non-transitory, computer-readable storage media such as memory 502. For instance, memory 502 can include non-volatile storage to persistently store instructions 504, settings 506 (e.g. configuration settings, calibration settings, identification information, etc.), and/or data 508 (e.g., sensor data, battery status, etc.). Memory 502 can also include volatile storage that stores instructions 504, other data (working data or variables), or portions thereof during execution by processor 500.

Control circuit 214 includes a communication interface 216 to couple control circuit 214, via the Internet or other communications network, to various remote systems such as, but not limited to, backend systems, client devices, other controllers, or Internet-enabled devices (e.g., IoT sensors). Communication interface 216 can be a wired or wireless interface including, but not limited, a WiFi interface, an Ethernet interface, a Bluetooth interface, a fiber optic interface, a cellular radio interface, a satellite interface, etc. The communications interface 216 can be configured to communicate with client devices and/or cloud-based systems through a local area network co-located with the tank system (e.g. a home network) as described above. The communications settings, thus established, can be stored in memory 502. According to various embodiments, the communication interface 216 may utilize communication technologies such as, but not limited to, SigFox, NB-IoT, 4G, 5G, Lora, or the like.

Using the communication interface 216, the control circuit 214 may carry out wireless sniffing. In particularly, the control circuit 214 may utilize the communication interface 216 to locate nearby wireless access points, determine respective signal strengths, etc. Such information may facilitate geo-locating the tank 110, for example.

A component interface 510 is also provided to couple control circuit 214 to various components of the sensor assembly 210. For instance, component interface 510 can connect control circuit 212 to sensors (such as ultrasound sensor 326) or input/output devices (e.g., buttons, indicators, LEDs, displays, etc.). Via the component interface 510, the control circuit 214 can acquire readings from sensors. Accordingly, component interface 510 can include a plurality of electrical connections on a circuit board or internal bus of control circuit 214 that is further coupled to processor 500, memory 502, etc. Further, the component interface 510 can implement various wired or wireless interfaces such as, but not limited to, a USB interface, a serial interface, a WiFi interface, a short-range RF interface (Bluetooth), an infrared interface, a near-field communication (NFC) interface, etc.

As shown in FIG. 6, the control circuit can include an integrated level sensor 512. Accordingly, the level sensor configured to provide a fluid level reading of the tank system can be included in a common housing with the other components of the control circuit 214 (i.e. processor 500, memory 502, etc.). However, it is to be appreciated that the level sensor 512 may be a separate component coupled to control circuit 214 via the component interface 510, as shown in FIG. 3, for example.

Figure 7:
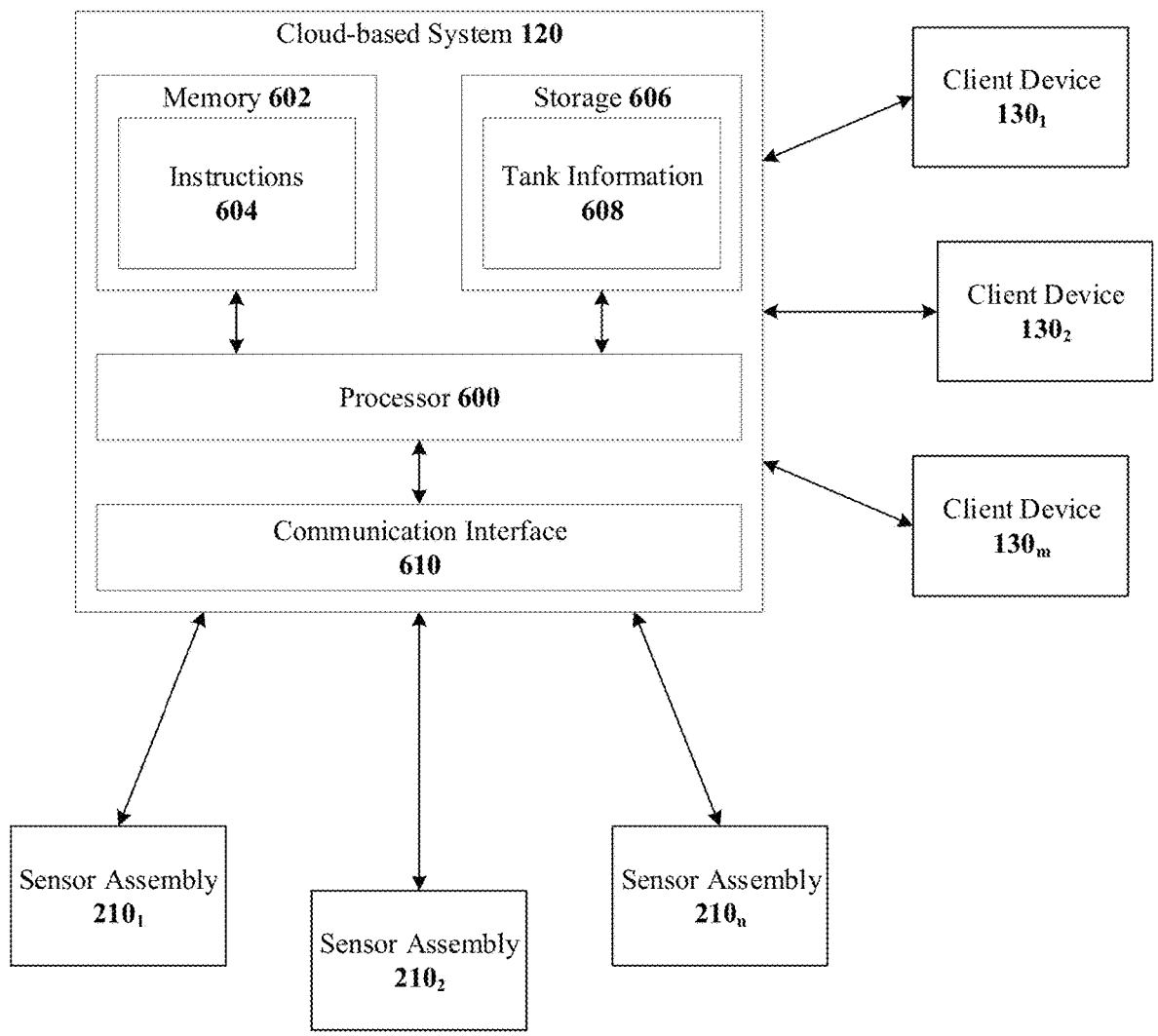
FIG. 7 is a schematic block diagram of an exemplary, non-limiting embodiment of a cloud-based management system according to one or more aspects.

Referring to FIG. 7, an exemplary, non-limiting embodiment of a cloud-based system 120 is illustrated. As shown in FIG. 7, cloud-based system 120 includes one or more processor(s) 600 configured to execute computer-executable instructions 604 such as instructions composing a server process to orchestrate tank monitoring and management. Such computer-executable instructions can be stored on one or more computer-readable media including non-transitory, computer-readable storage media such as memory 602 or storage 606. For instance, storage 606 can include non-volatile storage to persistently store instructions 604 and/or tank information 608 (e.g., history data, fluid level data, filling history, fluid type, tank identifications, etc.) received from sensor assemblies 210 associated with various tanks 110. Memory 602 can also include volatile storage that stores instructions 604, other data (working data or variables), or portions thereof during execution by processor 600. The tank information 608 can be stored in association with tank identifications (e.g. serial numbers or other identifiers) of tanks 110 having sensor assemblies 210 associated therewith.

Cloud-base system 120 further includes a communication interface 610 to couple cloud-based system 120, via the Internet or other communications network, to sensor assemblies 210 and client devices 130. Communication interface 610 can be a wired or wireless interface including, but not limited, a WiFi interface, an Ethernet interface, a Bluetooth interface, a fiber optic interface, a cellular radio interface, a satellite interface, etc. As shown in FIG. 7, cloud-based system 120 can service a plurality of sensor assemblies 210, which include sensor assembly $210_1$, sensor assembly $210_2$, . . . , sensor assembly $210_n$, where n is an integer greater than or equal to one. The sensor assemblies 210 can be associated with different tanks 110. Similarly, a plurality of client devices $130_1$, $130_2$, . . . , $130_m$ (where m is an integer greater than or equal to one) can communicate with cloud-based system 120. Client devices 160 can be associated with various users such as tank owners, gas vendors, manufacturers, etc.

Figure 8:
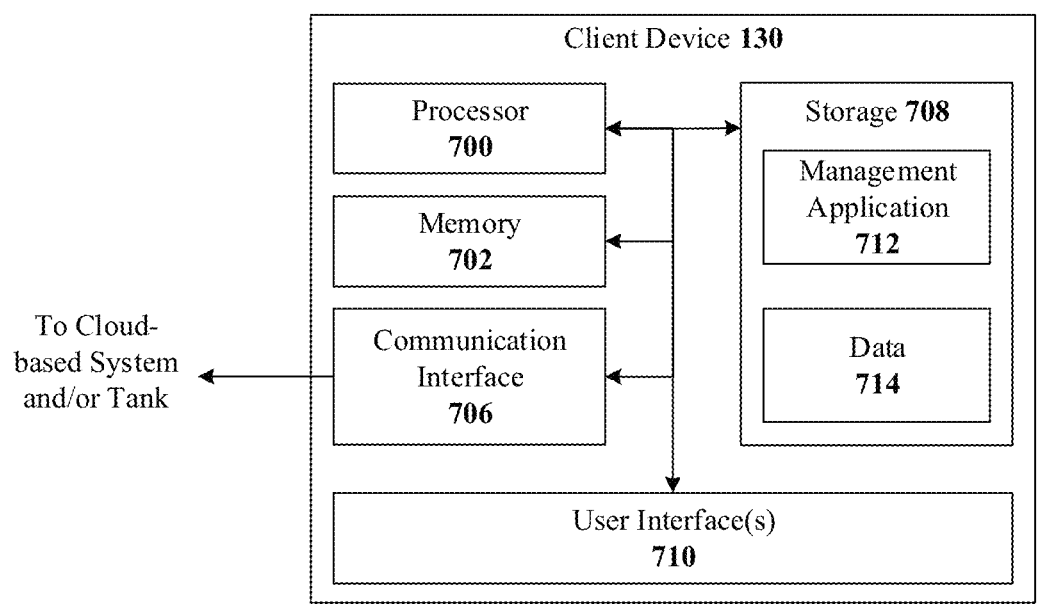
FIG. 8 is a schematic block diagram of an exemplary, non-limiting embodiment of a client device in accordance with various aspects.

Turning now to FIG. 8, a schematic block diagram of an exemplary, non-limiting embodiment of a client device is illustrated. Client device 130 includes one or more processor(s) 700 configured to execute computer-executable instructions such as instructions composing a management application 712. Such computer-executable instructions can be stored on one or more computer-readable media including non-transitory, computer-readable storage media such as memory 702 or storage 708. For instance, storage 708 can include non-volatile storage to persistently store management application 712 and/or data 714 (e.g., tank identification, level readings, etc.). Memory 702 can also include volatile storage that stores instructions, other data (working data or variables), or portions thereof during execution of management application 712 by processor 700.

Client device 130 further includes a communication interface 706 to couple client device 130, via the Internet or other communications network, to a tank 110 and/or cloud-based system 120. Communication interface 706 can be a wired or wireless interface including, but not limited, a WiFi interface, an Ethernet interface, a Bluetooth interface, a fiber optic interface, a cellular radio interface, a satellite interface, etc. Client device 130 can further include a user interface 710 that comprises various elements to obtain user input and to convey user output. For instance, user interface 710 can comprise of a touch display, which operates as both an input device and an output device. In addition, user interface 710 can also include various buttons, switches, keys, etc. by which a user can input information to client device 130; and other displays, LED indicators, etc. by which other information can be output to the user. Further still, user interface 710 can include input devices such as keyboards, pointing devices, and standalone displays.

In accordance with an embodiment, client device 130 is a computing device, which is readily carried by a user, such a smartphone or tablet device. However, it is to be appreciated that client device 130 can be other portable form-factors such as a laptop computer, a convertible laptop, a watch computing device, or the like. Moreover, client device 130 can be a desktop computer, or other larger, less portable computing device. That is, management application 712 can be installed and executed on substantially any computing device provided that such a computing device can communicate with cloud-based system 120 and/or sensor assemblies 210 (tanks 110) as described herein.

Figure 9:
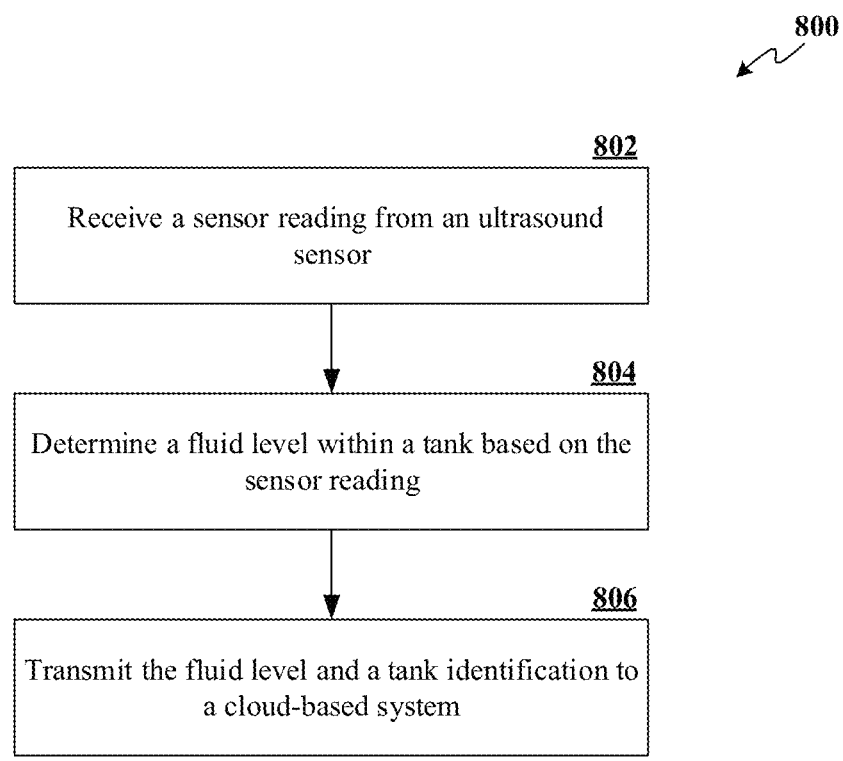
FIG. 9 is a flow diagram of an exemplary, non-limiting embodiment for managing a tank in accordance with various aspects.

Referring now to FIG. 9, illustrated is a flow diagram of a method 800 for managing a tank. Method 800 can be implemented, for example, by sensor assembly 210 described above. At 802, a sensor reading is received from an ultrasound sensor. The sensor may be mounted to a tank housing a pressurized fluid such as shown in FIG. 3. At 804, a fluid level within the tank is determined based on the sensor reading. At 806, the fluid level and a tank identification is transmitted to a cloud-based system.

Figure 10:
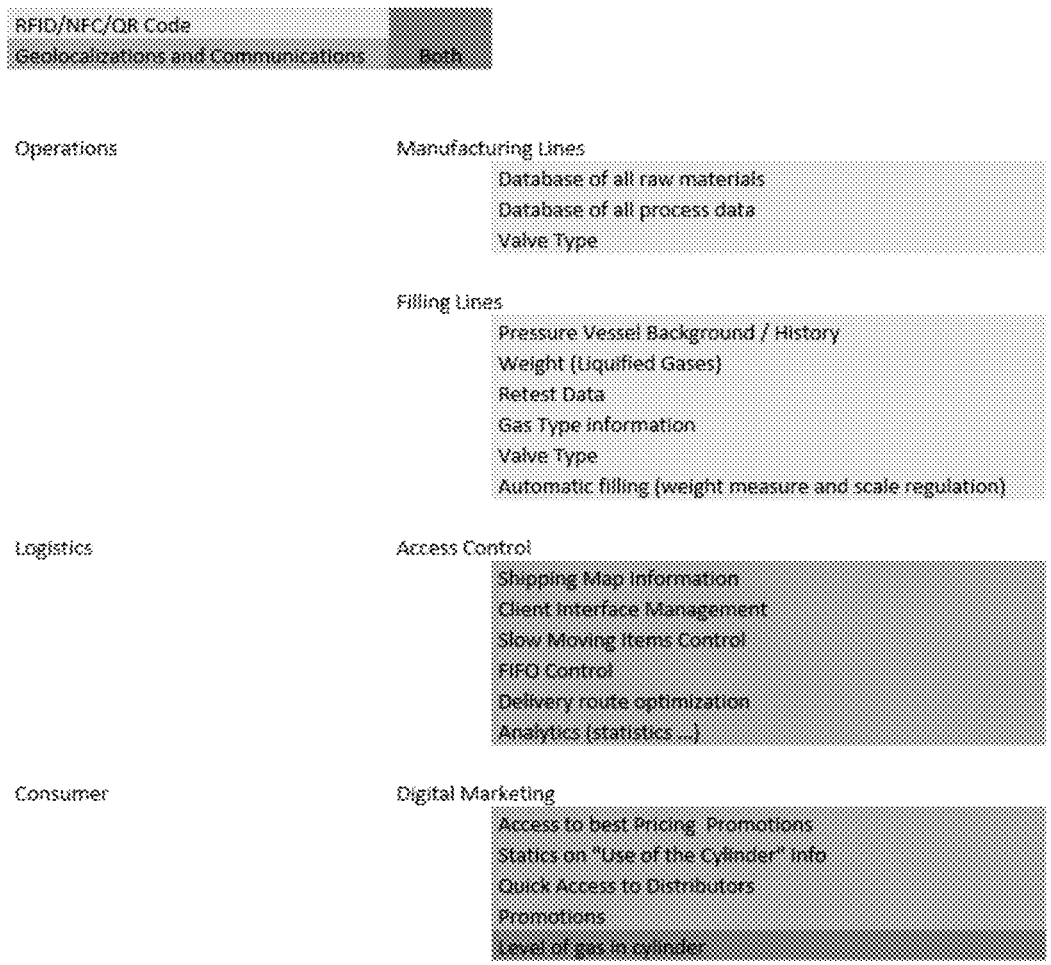
FIG. 10 indicates exemplary, non-limiting types of data communicated in the systems and methods described herein.

FIG. 10 indicates types of data communicated in the systems and methods described above. The data are coded to indicate a source and/or means via which the data are communicated. For example, information supporting manufacturing and/or filling lines from Operations may relate to data acquired from indicia 200. Information supporting Logistics and/or the Consumer may relate to data provided via geolocation and/or communication interface 216. Moreover, the level of the gas in a cylinder may be provided via both sources.

FIG. 10 further indicates an intended target or purpose of the data. For example, at a filling line, indicia 200 may be read and a corresponding ID is sent to a database. The database may return information such as cylinder information including data of manufacture, date for requalification, weight tare, etc. The cylinder bearing indicia 200 may be segregated if the date for requalification has passed. Further, a number of times the cylinder has been filled can be recorded by reading indicia 200 at the filling lines.

Logistics may also be supported with the systems and methods described herein. For instance, a distributor, through a platform, may be warned of a need of the consumer (e.g. low fluid level). In response, a delivery order may be automatically created. The distributor may expedite delivery of a new cylinder depending on consumer need. The new cylinder may also bear indicia 200 as described above. Thus, a cylinder ID may be registered in the consumer history. Analysis of orders and deliveries may indicate consumer patterns to enable the distributor to anticipate needs of the consumers.

A consumer, using management application 712 for instance, may notify a dealer or distributor of a need for a new cylinder. The new cylinder is registered in a consumer account. The management application 712 enables the consumer to benefit from short delivery times, consult sites selling a product close to a residence, to be rewarded with offers, promotions, or bonuses, and the consumer is also aware of a consumption pattern.

In another embodiment, via a mobile device having the management application 712, a geolocation of a cylinder may be acquired. Thus, a distribution of assets may be identified, tracked, and managed. For instance, a number of times a particular indicia 200 is read by a mobile device, or other reader, is recorded.

One of ordinary skill in the art can appreciate that the various embodiments of the system described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the system can be implemented based on such a cloud environment. For example, cloud-based system 120 can reside in the cloud environment such that the computer-executable instruction implementing the functionality thereof are executed with the aggregated computing resources provided by the plurality of physical computing devices. The cloud environment provides one or more methods of access to the cloud-based system 120, which are utilized by management application 712 on client device 130 and sensor assembly 210. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 11:
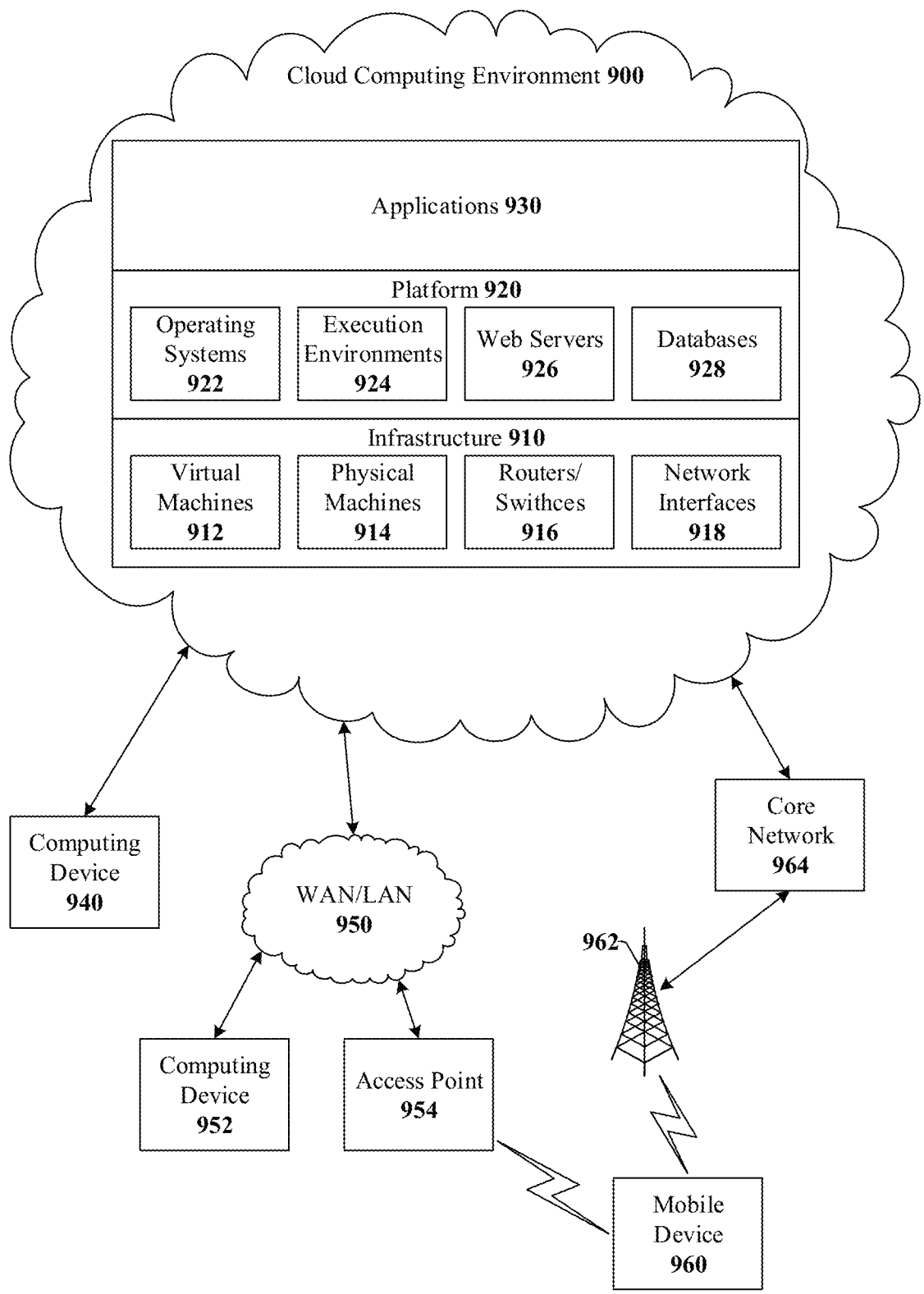
FIG. 11 is a block diagram representing an exemplary, non-limiting networked environment, including cloud or internet based, in which various embodiments described herein can be implemented.

FIG. 11 provides a schematic diagram of an exemplary networked or distributed computing environment, such as a cloud computing environment 900. The cloud computing environment 900 represents a collection of computing resources available, typically via the Internet, to one or more client devices. The cloud computing environment 900 comprises various levels of abstraction: infrastructure 910, a platform 920, and applications 930. Each level, from infrastructure 910 to applications 930 is generally implemented on top of lower levels, with infrastructure 910 representing the lowest level.

Infrastructure 910 generally encompasses the physical resources and components on which cloud services are deployed. For instance, infrastructure 910 can include virtual machines 912, physical machines 914, routers/switches 916, and network interfaces 918. The network interfaces 918 provide access to the cloud computing environment 900, via the Internet or other network, from client devices such as computing devices 940, 952, 960, etc. That is, network interfaces 918 provide an outermost boundary of cloud computing environment 900 and couple the cloud computing environment 900 to other networks, the Internet, and client computing devices. Routers/switches 916 couple the network interfaces 918 to physical machines 914, which are computing devices comprising computer processors, memory, mass storage devices, etc. Hardware of physical machines 914 can be virtualized to provide virtual machines 912. In an aspect, virtual machines 912 can be executed on one or more physical machines 914. That is, one physical machine 914 can include a plurality of virtual machines 912.

Implemented on infrastructure 910, platform 920 includes software that forming a foundation for applications 930. The software forming platform 920 includes operating systems 922, programming or execution environments 924, web servers 926, and databases 928. The software of platform 920 can be installed on virtual machines 912 and/or physical machines 914.

Applications 930 include user-facing software applications, implemented on platform 920, that provide services to various client devices. In this regard, the backend system 150 of the well management system 100 described herein is an example application 930. As illustrated in FIG. 11, client devices can include computing devices 940, 952 and mobile device 960. Computing devices 940, 952 can be directly coupled to the Internet, and therefore the cloud computing environment 900, or indirectly coupled to the Internet via a WAN/LAN 950. The WAN/LAN 950 can include an access point 954 that enables wireless communications (e.g., WiFi) with mobile device 960. In this regard, via access point 954 and WAN/LAN 950, mobile device 960 can communicate wirelessly with the cloud computing environment 900. Mobile device 960 can also wirelessly communicate according to cellular technology such as, but not limited to, GSM, LTE, WiMAX, HSPA, etc. Accordingly, mobile device 960 can wirelessly communicate with a base station 962, which is coupled to a core network 964 of a wireless communication provider. The core network 964 includes a gateway to the Internet and, via the Internet, provides a communication path to the cloud computing environment 900.

These features as well as other features are further described in Appendices A-C, which are attached hereto and form a part of this specification.

As mentioned above, while exemplary embodiments have been described in connection with various computing devices and network architectures, the underlying concepts may be applied to any network system and any computing device or system in which it is desirable to implement an image segmentation system.

Also, there are multiple ways to implement the same or similar functionality, e.g., an appropriate API, tool kit, driver code, operating system, control, standalone or downloadable software objects, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A level sensor system, comprising:
a tank configured to store a liquified pressurized gas;
a base for supporting the tank in a vertical orientation; and
a sensor assembly associated with the tank, the sensor assembly comprising:
an ultrasound sensor configured to output a sensor reading indicative of a fluid level within the tank;
a control circuit configured to interpret the sensor reading and determine the fluid level; and
a communications interface for transmitting the fluid level to a remote system; wherein the sensor assembly is encapsulated in a shock absorbing material and housed within the base.

2. The level sensor system of claim 1, further comprising a tag associated with the tank configured to provide a tank identification via machine-readable or human-readable indicia.

3. The level sensor system of claim 2, wherein the tag is at least one of a QR code, a barcode, an NFC tag, or a RFID tag.

4. The level sensor system of claim 2, wherein the tank identification is transmitted to the remote system with the fluid level.

5. The level sensor system of claim 4, wherein the sensor assembly is at least partially received within the recess.

6. The level sensor system of claim 1, wherein the tank includes a recess formed on a bottom surface thereof.

7. The level sensor system of claim 1, wherein the sensor assembly is mounted to the tank to position the ultrasound sensor at a center point of a bottom surface of tank.

8. The level sensor system of claim 1, wherein the sensor assembly includes a stabilization member to bias the ultrasound sensor against a surface of tank and maintain contact.

9. The level sensor system of claim 8, wherein the stabilization member is one of a spring, a memory foam, or a gel layer.

10. The level sensor system of claim 1, wherein the sensor assembly further includes a temperature sensor.

11. The level sensor system of claim 10, wherein the control circuit is further configured to interpret a temperature signal from the temperature sensor to determine a temperature reading.

12. The level sensor system of claim 11, wherein the control circuit is further configured to compare the temperature reading to a threshold.

13. The level sensor system of claim 12, wherein the communication interface is configured to communication an alarm notification when the temperature reading exceeds the threshold.

14. A method, comprising:
acquiring an ultrasound signal indicative of a fluid level within a tank from sensor assembly attached to the tank;
determining a fluid level within the tank based on the ultrasound signal; and
communicating the fluid level to a remote system;
wherein sensor assembly is encapsulated in a shock absorbing material and housed within a base of the tank.

15. The method of claim 14, wherein sensor assembly is positioned at center portion of a bottom surface of the tank.

16. The method of claim 14, further comprising:
acquiring a temperature signal from the sensor assembly;
determining a temperature within the thank based on the temperature signal;
comparing the temperature with a threshold; and
communicating an alarm notification to the remote system when the temperature exceeds the threshold.

17. A system, comprising:
a level sensor system, including:
- a tank configured to store a liquefied pressurized gas;
- a base for supporting the tank in a vertical orientation; and
- a sensor assembly encapsulated in a shock absorbing material and housed within the base, the sensor assembly comprising:
  - an ultrasound sensor configured to output a sensor reading indicative of a fluid level within the tank;
  - a control circuit configured to interpret the sensor reading and determine the fluid level; and
  - a communications interface for transmitting the fluid level to a remote system;

the remote system being communicatively coupled with the sensor assembly via a communication network, wherein the remote system stores tank information received from the sensory assembly in association with a tank identified corresponding to the tank; and a client device communicatively coupled to the remote system and the level sensor system.

18. The system of claim 17, further comprising a tag attached to the tank, the tag providing the tank identification.

\* \* \* \* \*